Figure 1:
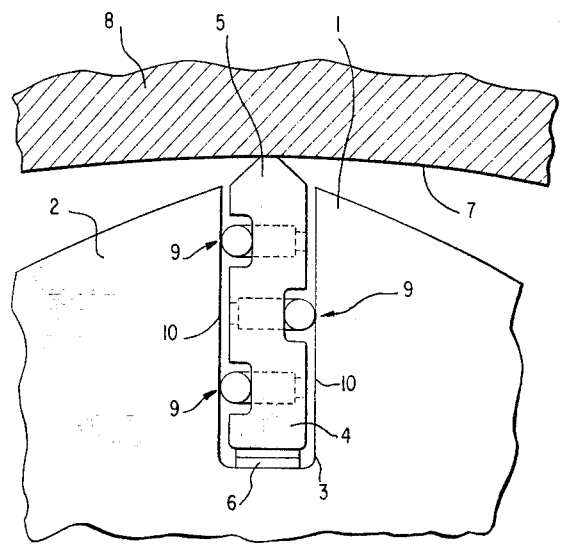

United States Patent Office 3,277,873
Patented Oct. 11, 1966

3,277,873
SEALING STRUCTURE
Werner Brodbeck and Richard Ehrhardt, Stuttgart-Unterturkheim, Germany, assignors to Daimler-Benz Aktiengesellschaft, Stuttgart-Unterturkheim, Germany
Filed July 17, 1963, Ser. No. 295,625
Claims priority, application Germany, July 21, 1962,
D 39,431
10 Claims. (Cl. 123—8)

The present invention relates to a radial seal for rotary-piston internal combustion engines of trochoidal construction, which essentially consists of a sealing bar member arranged within a groove of the piston extending parallel to the axis thereof and pressed radially outwardly against the inner surfaces of the enclosure body by resilient or elastic means.

With radial seals of this type a sliding friction has been provided heretofore without exception between the side walls of the sealing bar member and the flanks of the groove extending axially parallelly. Since in actual operation of rotary-piston internal combustion engines it has been proved that the friction of the sealing bar member within the groove thereof is determinative to a large extent for the quality of the seal, the present invention proposes to replace the sliding friction which depends on numerous factors and therewith is uncontrollable, by a rolling friction in that the sealing bar member is supported by means of a roller bearing within the groove thereof.

Advantageously, the roller bearing may consist of rollers which are supported within grooves extending parallel to the axis within the side walls of the sealing bar member. One groove each may be arranged within one of the side walls of the sealing bar member within a lower and an upper area and one groove for the rollers may be arranged within the center area of the other side wall.

The grooves may extend over the entire length of the sealing bar member and a continuous sequence of rollers may be arranged therein. Additionally, blocking pins for the rollers may be arranged at the ends of the grooves which prevent that the rollers leave the groove thereof in the axial direction.

Accordingly, it is an object of the present invention to provide a seal structure for a rotary-piston which eliminates the drawbacks and shortcomings encountered with the prior art constructions in an effective and reliable manner.

Another object of the present invention resides in the provision of a sealing arrangement for a rotary-piston internal combustion engine which not only improves the operation of the engine but also assures controllable good performance thereof throughout its useful life.

A still further object of the present invention resides in the provision of a seal for a rotary-piston internal combustion engine which is simple in construction, reliable in operation, yet eliminates the uncontrollable sliding friction heretofore encountered with similar types of seals.

Figure 2:
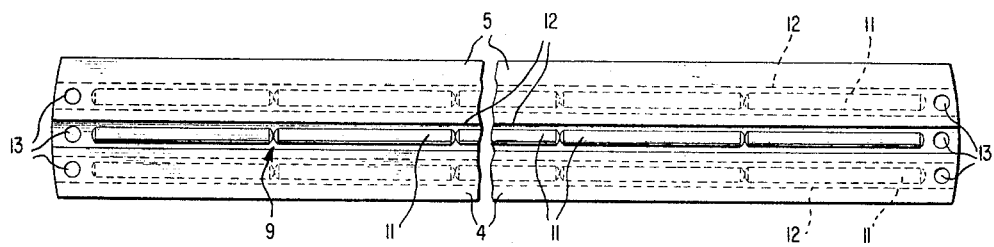

These and other objects, features and advantages of the present invention will become more obvious from the following description when taken in connection with the accompanying drawing which shows, for purposes of illustration only, one embodiment in accordance with the present invention, and wherein:

FIGURE 1 is a partial transverse cross-sectional view through a part of an internal-combustion engine provided with a radial seal in the piston thereof in accordance with the present invention, the cross section being taken in a plane perpendicular to the axis of the engine, and FIGURE 2 is a side-elevational view of the radial seal of FIGURE 1 in accordance with the present invention.

Referring now to the drawing wherein like reference numerals are used throughout the various views to designate like parts, and more particularly to FIGURE 1, the sealing bar member 4 is arranged so as to be movable in the radial direction within the groove 3 extending parallelly to the axis of the engine and provided within the corner of the polygonal piston 2. The sealing bar member 4 is pressed with the head portion 5 thereof against the inner surfaces 7 of the enclosure body 8 constituted by the engine housing by means of the spring 6. In order to achieve a rolling friction of the sealing bar member 4 within the groove 3 thereof, a roller bearing, generally designated by reference numeral 9, is provided on each side of the sealing bar member 4 between the latter and the flanks 10 of the groove 3. One roller bearing generally designated by reference numeral 9 is thereby arranged on one side of the sealing bar member 4 within an upper and within a lower area thereof and one roller bearing generally designated by reference numeral 9 is arranged on the other side of the sealing bar member within a central area thereof.

As may be seen more clearly from FIGURE 2, each roller bearing 9 consists of a sequence of rollers 11 which are disposed within a groove 12 extending parallelly to the axis within the side wall of the sealing bar member 4. The grooves 12 are closed off on both sides thereof by blocking pins 13 so that the rollers cannot leave the grooves unintentionally.

Instead of a sequence of rollers, a single roller approximately in the form of a steel wire piece may also be arranged in each groove 12. Furthermore, instead of the illustrated unsymmetric arrangement of the grooves 12, a symmetric arrangement thereof may also be provided so that, for example, the same number of grooves 12 is present on each side of the sealing bar member 4.

While we have shown and described one embodiment in accordance with the present invention, it is understood that the same is not limited thereto but is susceptible of numerous changes and modifications within the spirit and scope thereof as known to a person skilled in the art; and we, therefore, do not wish to be limited to the details shown and described herein but intend to cover all such changes and modifications as are encompassed by the scope of the appended claims.

We claim:

1. A radial seal for rotary-piston internal combustion engines of trochoidal construction which have an enclosure body provided with internal surfaces along which rotates a piston, comprising:

groove means provided within the piston and extending substantially parallelly to the axis of the engine,
   sealing bar means within said groove means,
   means normally urging said sealing bar means radially outwardly against the inner surfaces of the enclosure body,
   and roller bearing means for supporting said sealing bar means within said groove means,
   said roller bearing means including a plurality of roller members supported within grooves extending substantially parallelly to the axis of the piston within the side walls of said sealing bar means,
   one of said side walls being provided with a first one of said grooves in a lower region thereof and with a second one of said grooves in the upper region thereof, and the other side wall being provided with a third one of said grooves in the center region thereof directly adjacent and between said first and second grooves for accommodating therein said roller members, each of said grooves lying at substantially different distances from the radially inner edge of said sealing bar means.

2. A radial seal for rotary-piston internal combustion engines of trochoidal construction which have an enclosure body provided with internal surfaces along which rotates a piston, comprising:
groove means provided within the piston and extending substantially parallelly to the axis of the engine,
sealing bar means within said groove means,
means normally urging said sealing bar means radially outwardly against the inner surfaces of the enclosure body,
and roller bearing means for supporting said sealing bar means within said groove means,
said roller bearing means including a plurality of roller members supported within grooves extending substantially parallelly to the axis of the piston within the side walls of said sealing bar means,
one of said side walls being provided with one of said grooves in a lower region thereof and with another one of said grooves in the upper region thereof, and the other side wall being provided with one groove in the center region thereof for accommodating therein said roller members,
said grooves extending substantially over the entire length of the sealing bar means and a continuous series of roller members being arranged in each of said grooves.

3. A radial seal for rotary-piston internal combustion engines of trochoidal construction which have an enclosure body provided with internal surfaces along which rotates a piston, comprising:
groove means provided within the piston and extending substantially parallelly to the axis of the engine,
sealing bar means within said groove means,
elastic means normally urging said sealing bar means radially outwardly against the inner surfaces of the enclosure body,
and roller bearing means for supporting said sealing bar means within said groove means,
said roller bearing means including a plurality of roller members supported within grooves extending substantially parallelly to the axis of the piston within the side walls of said sealing bar means,
one of said side walls being provided with one of said grooves in a lower region thereof and with another one of said grooves in the upper region thereof, and the other side wall being provided with one groove in the center region thereof for accommodating therein said roller members,
said grooves extending substantially over the entire length of the sealing bar means and a continuous series of roller members being arranged in each of said grooves,
and blocking means for the roller members in the form of pins arranged at the ends of the grooves.

4. In a radial seal for rotary-piston internal combustion engines of trochoidal construction having an enclosure body with internal surfaces along which rotates a piston, said radial seal including a sealing bar arranged within a piston groove extending substantially parallelly to the axis of the engine which is pressed radially outwardly against said inner surfaces by elastic means,
the improvement essentially consisting of roller bearing means for supporting the sealing bar within the groove thereof,
one of said side walls being provided with two grooves for the roller bearing means, one in the upper region and one in the lower region thereof and the other side wall being provided with one groove for the roller bearing means within the central area thereof.

5. A radial seal for rotary-piston internal combustion engines of trochoidal construction which have an enclosure body provided with internal surfaces along which rotates a piston, comprising:
groove means provided within the piston and extending substantially parallelly to the axis of the engine,
sealing bar means within said groove means,
means normally urging said sealing bar means radially outwardly against the inner surfaces of the enclosure body,
roller bearing means for supporting said sealing bar means within said groove means,
and grooves within the side walls of said sealing bar means for the roller bearing means,
said grooves extending substantially over the entire length of the sealing bar means and a continuous series of roller members being arranged in each of said grooves.

6. A radial seal for rotary-piston internal combustion engines of trochoidal construction which have an enclosure body provided with internal surfaces along which rotates a piston, comprising:
groove means provided within the piston and extending substantially parallelly to the axis of the engine,
sealing bar means within said groove means,
elastic means normally urging said sealing bar means radially outwardly against the inner surfaces of the enclosure body,
roller bearing means for supporting said sealing bar means within said groove means,
and grooves within the side walls of said sealing bar means for the roller bearing means,
said grooves extending substantially over the entire length of the sealing bar means and a continuous series of roller members being arranged in each of said grooves,
and blocking means in the form of pins arranged at the ends of the grooves for the roller bearing means.

7. A radial seal for rotary-piston internal combustion engines of trochoidal construction which have an enclosure body provided with internal surfaces along which rotates a piston, comprising:
groove means provided within the piston and extending substantially parallelly to the axis of the engine,
sealing bar means within said groove means,
elastic means normally urging said sealing bar means radially outwardly against the inner surfaces of the enclosure body,
roller bearing means for supporting said sealing bar means within said groove means,
and grooves within the side walls of said sealing bar means for the roller bearing means,
and blocking means in the form of pins arranged at the ends of the grooves for the roller bearing means.

8. A rotary piston expansible chamber device comprising:
an enclosure;
piston means mounted for rotation relative to said enclosure;
sealing means between said piston means and said enclosure, including a groove extending substantially parallel to the axis of rotation, sealing bar means within said groove movable generally transverse to said axis, roller means between said groove and said sealing bar means providing an anti-friction bearing between said groove and said sealing bar means, secondary groove means retaining said roller means between said groove and said sealing bar means including blocking pins arranged at the ends of said secondary groove means blocking said roller means from moving out of said secondary groove means.

9. A rotary piston expansible chamber device comprising:
an enclosure;
piston means mounted for rotation relative to said enclosure;

sealing means between said piston means and said enclosure, including a groove extending substantially parallel to the axis of rotation, sealing bar means within said groove movable generally transverse to said axis, roller means between said groove and said sealing bar means providing an anti-friction bearing between said groove and said sealing bar means, secondary groove means retaining said roller means between said groove and said sealing bar means, said secondary groove means extending substantially over the entire length of said groove, said roller means presenting a substantially continuous sealing line extending substantially over the entire length of said secondary groove means, 10. The device of claim 9 wherein said secondary groove means includes blocking pins arranged at the ends of said secondary groove means blocking said roller means from moving out of said secondary groove means.

References Cited by the Examiner

UNITED STATES PATENTS

| | | | |
|---|---|---|---|
| 1,199,229 | 9/1916 | Augustine | 123—16 |
| 1,865,666 | 7/1932 | Aruga | 123—16 X |
| 2,048,825 | 7/1936 | Smelser | 123—16 |
| 2,274,232 | 2/1942 | Boyer | 123—16 |
| 2,880,045 | 3/1959 | Wankel | 123—8 X |
| 2,988,065 | 6/1961 | Wankel et al. | 123—8 |
| 3,056,391 | 10/1962 | Hoadley | 123—16 |

MARK NEWMAN, *Primary Examiner.*

SAMUEL LEVINE, *Examiner.*

F. T. SADLER, *Assistant Examiner.*